O. YOUNGKIN & H. H. HICKS.
POTATO DIGGER.
APPLICATION FILED MAY 7, 1913.

1,129,939.

Patented Mar. 2, 1915

4 SHEETS—SHEET 1.

WITNESSES:
Alfred Casey
Lester L. Sargent

INVENTORS
Owen Youngkin,
Harry H. Hicks,
By Jerry A. Mathews ATTORNEY

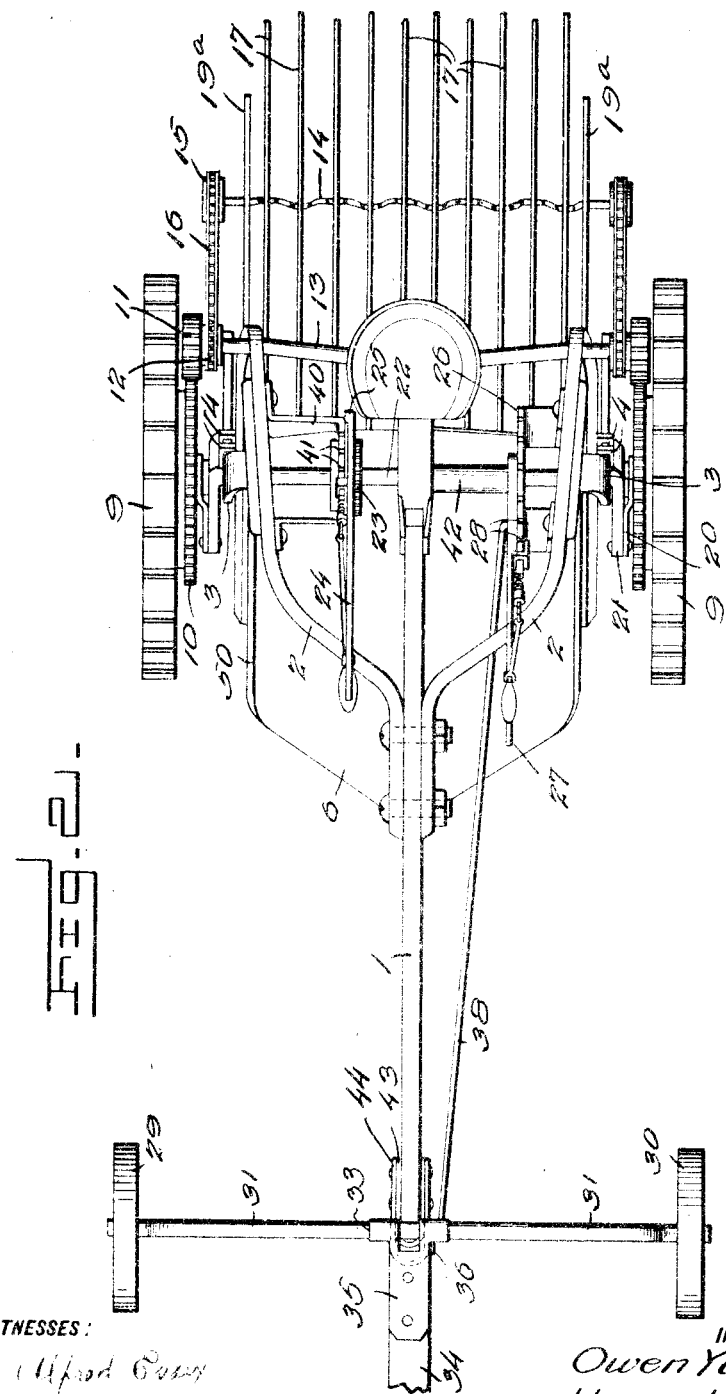

O. YOUNGKIN & H. H. HICKS.
POTATO DIGGER.
APPLICATION FILED MAY 7, 1913.

1,129,939.

Patented Mar. 2, 1915.
4 SHEETS—SHEET 3.

WITNESSES:

INVENTORS
Owen Youngkin
Harry H. Hicks,
ATTORNEY

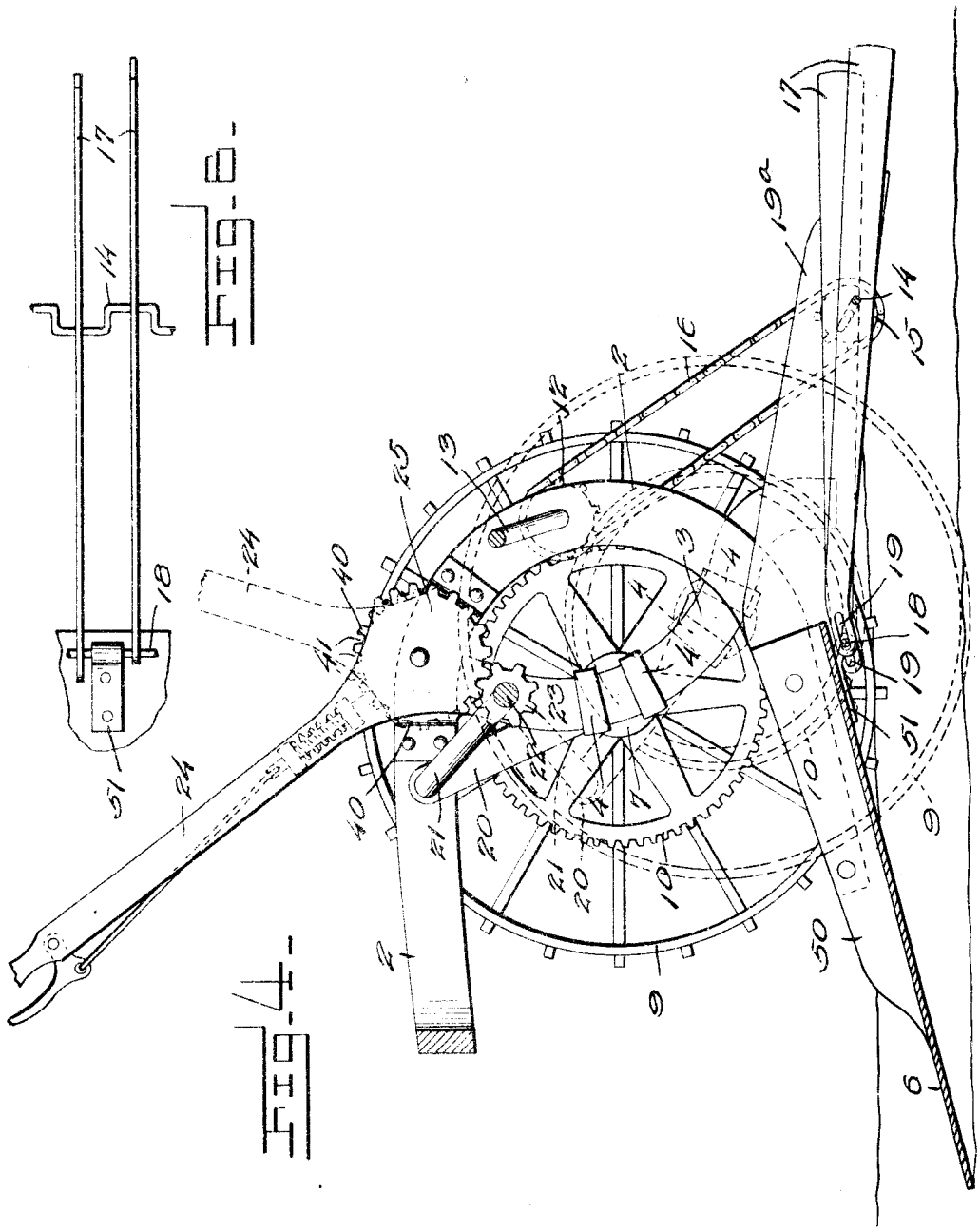

UNITED STATES PATENT OFFICE.

OWEN YOUNGKIN, OF RICHFIELD, AND HARRY H. HICKS, OF WEISER, IDAHO.

POTATO-DIGGER.

1,129,939.

Specification of Letters Patent. Patented Mar. 2, 1915.

Application filed May 7, 1913. Serial No. 766,198.

*To all whom it may concern:*

Be it known that we, OWEN YOUNGKIN, of Richfield, Idaho, and HARRY H. HICKS, of Weiser, Idaho, have jointly invented a new and useful Potato-Digger, of which the following is a specification.

The object of our invention is to provide an improved and more efficient potato harvesting machine; to provide in combination in such a machine an improved plow and shaker-separator mechanism, novel and efficient means for lowering and elevating the plow and shaker-separator mechanism, and novel and independently-controlled means for adjusting the plow.

It is also our object to provide as a part of our new potato digger improved means for operating the shaker mechanism and to make improvements in such mechanism.

It is a further object of our invention to provide in combination therewith conveniently positioned and easily operated as well as novel means for adjusting the potato digger, as desirable.

It is also our object to provide novel mechanism for supporting the frame of the machine, and to introduce novel parts, combined, arranged and constructed advantageously, as described hereinafter and illustrated in the accompanying drawings, which form a part of this specification.

Figure 1:
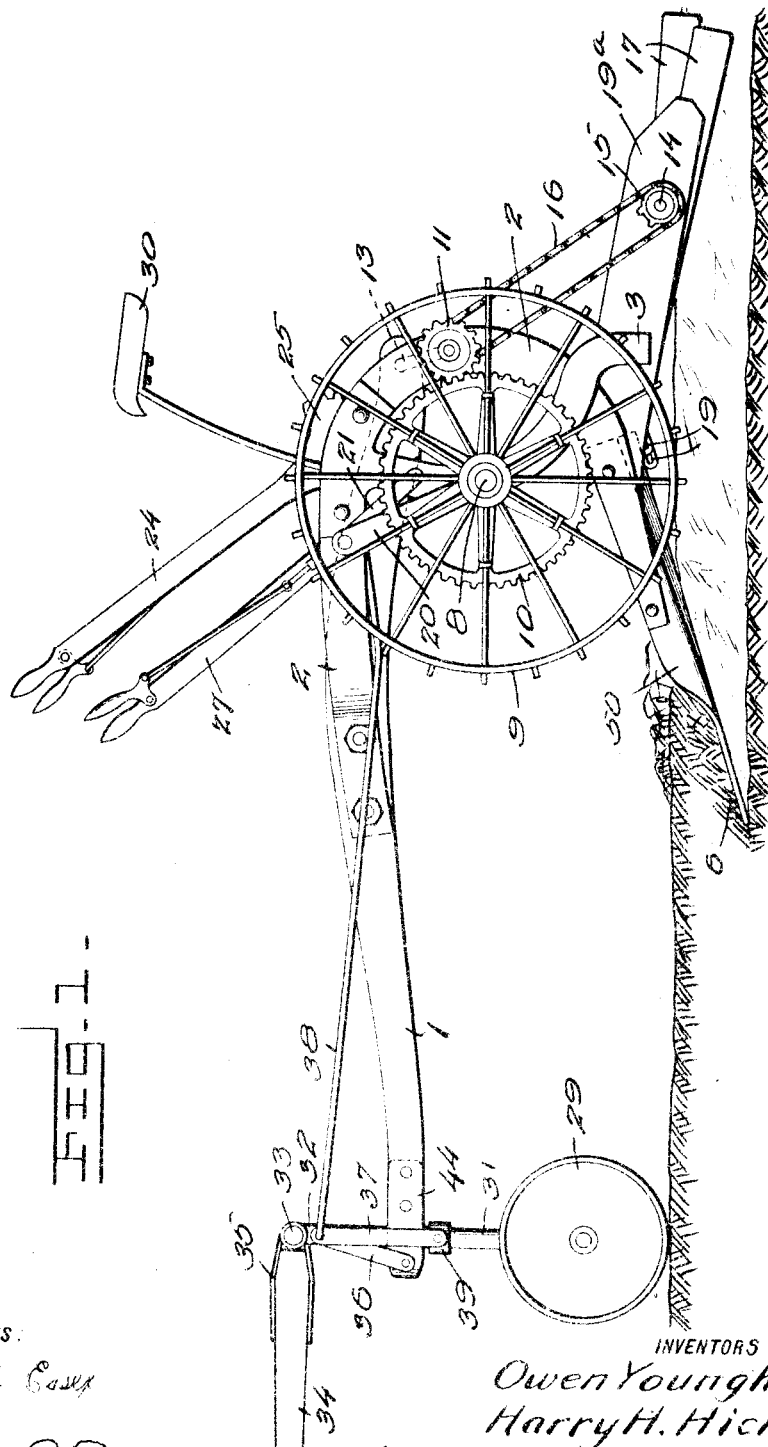
Figure 5:
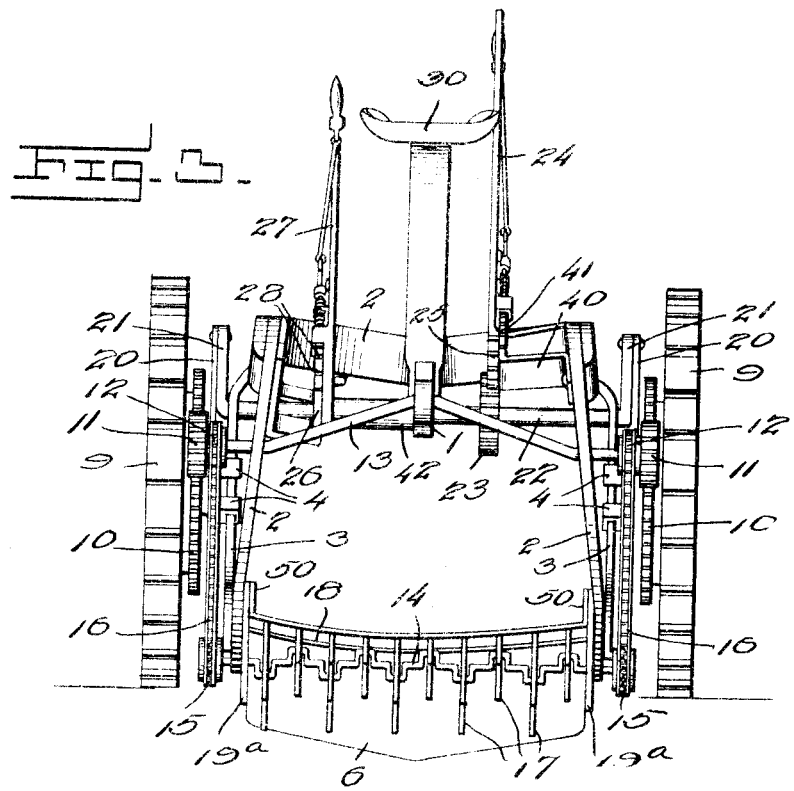
Figure 6:
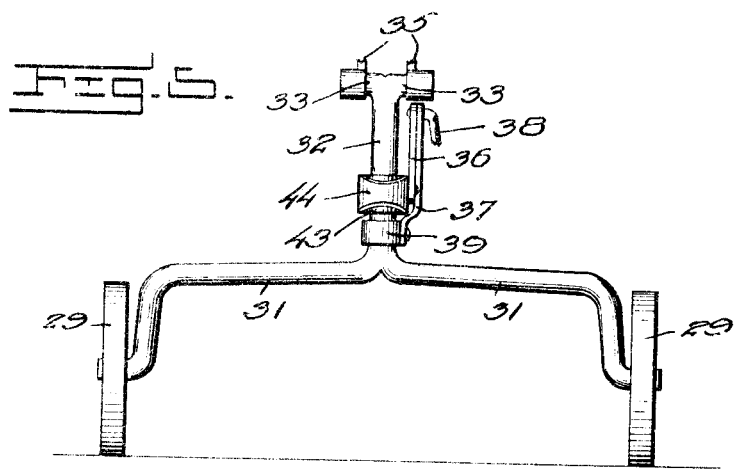

Figure 1 is a side elevation; Fig. 2 is a top plan; Fig. 3 is a rear view of the machine; Fig. 4 is a sectional view of Fig. 2; Fig. 5 is a detail view of the front truck; Fig. 6 is a detail bottom plan view of the shaking members.

Like characters of reference indicate like parts throughout the several views.

The main frame of the machine comprises a beam 1; plow-supporting bars 2, secured to the beam and shaped substantially as illustrated in the drawings; and a plow 6, rigidly secured to the beam by the aforesaid bars 2, which preferably are secured to upturned plow side guides 50, as shown in Fig. 1. The frame of the machine is supported by frame-supporting arms 3. attached to and depending from plow-supporting bars 2. Sleeve members 4 are provided for the purpose of holding the frame-supporting arms 3, which may be raised or lowered to lessen or increase the working depth of the plow.

Road wheels 9 are provided with axles 8. Sleeve members 4 are secured to the wheel hubs 7, as illustrated.

Secured to and rotating with wheels 9, or formed integrally therewith is a gear 10, of large size, on each side of the machine. A small gear 11 mounted on cross bar 13, which extends across the frame work of the machine, is provided and positioned to engage with and be operated by gear 10. Rigidly secured to or formed integrally with gear 11 is a sprocket wheel 12. A chain 16 is provided on each side of the machine, engaging with sprocket wheel 12 and crank-shaft sprocket wheel 15. By this means the crank shaft 14, which extends across the machine, and to the ends of which the crank shaft sprocket wheels are secured, is operated.

The shaker separator mechanism comprises shaking members 17, in the form of blades having their forward ends offset, and having slots 19 provided therein, which are secured by a rod 18 which extends across the machine through slots 19 of the shaking members 17, and is positioned beneath the rear portion of the plow, to which it is secured by fastening plate member 51, or any like suitable fastening device, the ends of the rod being secured to the plow-supporting bars 2, as illustrated in the drawings. The shaking members 17 are operated by the crank shaft 14, which is secured to each shaking member 17 at a substantially central position, and in operation causes an alternate rise and fall of the shaking members. Shaker guard members 19$^a$ are provided at each side of the shaker mechanism, as a substantial continuation of the side guides 50 formed on the plow. Shaker guard members 19$^a$ extend back past the crank shaft and crank shaft sprocket wheels and prevent vines, etc., from getting entangled in the machine.

To each of the axles 8, suitable bars 20 are fastened and extend in an upward forward direction and have their forward ends pivotally connected with arms 21 of cross bar 22. Rigidly secured to the cross bar 22, as illustrated in Figs. 2 and 3, is a cross-bar gear 23. A segment lever 24, provided with teeth 25, and having the ordinary spring and slidable pawl lever-locking mechanism, is arranged to engage with cross-bar gear 23. Segment lever 24 is preferably mounted on a plate member 40 which in turn is secured to the adjacent plow-supporting bar 2, and to cross bar 22, as illustrated in the drawings. Plate member 40 is in segment form and provided with notches 41, with which the lever mechanism may engage.

In a similar position to that occupied by plate member 40, on the opposite side of the machine a segment plate 26 is provided, secured in a rigid position in a suitable manner, as shown in Fig. 3. Pivotally secured to cross bar 22 and supported by segment plate 26 is a spring-operated hand lever 27, of usual construction. A sleeve 42 on cross bar 22, positioned between beam 1 and hand lever 27 prevents any lateral movement of lever 27 and insures its engagement with segment plate 26, which is provided with notches 28 as a means for locking the lever 27.

The forward end of beam 1 is secured to a truck consisting of wheels 29, mounted on axle members 31, which are preferably bent upwardly to about the height of the wheel, then laterally until they meet, then upwardly in union, together forming a centrally-positioned beam-end support 32, and having their upper ends bent out laterally to provide arms 33 to which the tongue 34 is secured by a suitable tongue-securing member 35, all substantially as illustrated in Fig. 5.

A U-shaped plate 43 affixed to the forward end of beam 1, is provided, through which the beam-end support 32 extends and by means of which the front truck is held fast to the beam. An outer extension member 44, preferably U-shaped as illustrated, is also affixed to the forward end of the beam over plate 43. To the projecting end of extension member 44 a bar 36 is attached and pivotally connected with beam-elevating rod 38, which extends practically the entire length of the beam, to hand lever 27, by means of which it is actuated. A sleeve 39 is affixed to the beam end support 32, near its base. To sleeve 39 is attached a sleeve-connecting bar 37, pivotally operating with beam-elevating rod 38. By means of rod 38, which as illustrated is operated by the hand lever 27, in connection with bars 36 and 37, the forward end of the beam may be conveniently raised or lowered, thus correspondingly tilting the plow.

A seat 30 is provided for the operator of the potato digger. This seat may be secured in a suitable central location on beam 1, as illustrated, so that the operator may conveniently grasp the hand levers on either side, which govern the operation and adjustment of the potato digger.

In operation, a forward thrust of hand lever 27 lowers the forward end of beam 1 on the beam end support 32. At the same time the plow, being rigidly attached to the beam, is tilted downwardly to a corresponding extent. In this way the angle at which the plow enters the ground may be made more or less acute as desired. The plow and frame mechanism thus arranged is adapted to withstand a considerable amount of strain.

Independently of the beam-elevating mechanism, by means of which the plow may be inclined more or less as desired, the main frame of the machine may conveniently be raised or lowered, by means of the segment lever 24, which engages with the cross bar gear 23, mounted on cross bar 22, which extends through beam 1 and frame-supporting arms 3, as illustrated in Figs. 3 and 4. Thus when segment lever 24 is thrust backward toward the rear, a forward rotary movement is imparted to cross-bar gear 23 and to cross bar 22 on which gear 23 is mounted. For example the heavy lines in Fig. 4 represent the beginning of the operation and the dotted lines in Fig. 4 the position of the parts when it was nearing completion. The cross-bar arms 21 and bars 20 together form a toggle joint on each side of the potato digger. The straightening of the members of this toggle joint, in consequence of the rotation of cross-bar 22 when segment lever 24 is thrust back depresses the plow and shaker mechanism to the greatest depth. On the other hand a forward movement of segment lever 24 reverses the operation and elevates the plow and shaker-separator mechanism by elevating the frame to which they are attached. The frame-supporting arms 3 while providing an adjustable means for raising and lowering the frame and plow and shaker-separator mechanism, are firmly supported in the sleeve members 4, as shown in the drawings.

The shaker-separator mechanism is independently operated, as heretofore more fully set forth, by a crank shaft 14, provided with opposite crank-shaft sprocket wheels 15 which are rotated by chains 16 from sprocket wheels 12. Sprocket wheels 12 are rigidly secured to gear 11, which in turn is actuated by gear 14, attached to the road wheels 9. The raising and lowering of the shaker-separator mechanism does not alter the tension of chains 16. The frame-supporting arms 3, as illustrated in Figs. 1 and 4, are shaped so as to maintain the proper adjustment of the frame and to provide uniform tension and smoothness of operation, whether the plow and shaker-separator mechanism be raised or lowered.

What we claim is:

1. In a potato digger, the combination of a beam, a plow, plow-supporting members securing the plow in a fixed position relative to the beam, frame-supporting arms affixed to the plow supporting members, and mechanism on which the frame-supporting arms are adjustably mounted, and means for adjusting the position of the frame-supporting arms relative to the mechanism on which they are mounted.

2. In a potato digger, the combination of a beam, a plow, plow-supporting members securing the plow in a fixed position relative to the beam, frame-supporting arms rigidly secured to the plow-supporting members, road wheel, axles therefor, sleeve members secured to the axles, in which sleeve members the frame-supporting arms are adjustably mounted, a cross bar extending through the beam and opposite frame-supporting arms and having cross-bar arms, and bars mounted on the axles of the machine and pivotally secured at their ends to the cross bar arms to form toggle joints, and means for rotating the cross bar.

3. In a potato digger, the combination of a frame comprising a beam, plow-supporting members affixed to the beam, plow and shaker mechanism secured to the plow-supporting members, means for adjustably elevating and lowering the plow and shaker mechanism without altering their relative relation and controlling mechanism consisting of a segment lever, having the ordinary spring and slidable pawl lever-locking mechanism, a notched plate member to which it is secured, and gear rigidly secured to the mechanism for adjustably elevating and lowering the plow and shaker mechanism, the aforesaid gear meshing with the aforesaid segment lever.

4. In a potato digger, main frame elevating and lowering mechanism comprising plow-supporting members having approximately ⟍-shaped arms and having an approximately U-shaped cross bar rotatably mounted in the plow-supporting members, lever mechanism actuating the cross bar, road wheels and road wheel axle mechanism operatively connected with and slidable upon the above-mentioned arms, and oppositely-positioned bars secured to the road-wheel axle mechanism at their lower ends and pivotally secured to the arms of the aforesaid cross bar at their upper ends, for elevating and lowering the plow-supporting members.

5. In a machine of the class described, a beam, a plow, plow supporting bars rigidly securing the plow to the beam, and substantially ⟍-shaped frame-supporting arms depending from the upper portion of the plow-supporting bars and rigidly secured thereto, and means connected with the aforesaid arm members for their support and the substantially vertical adjustment of the plow member.

In witness whereof, we hereunto attach our signatures, in the presence of two witnesses.

OWEN YOUNGKIN.
HARRY H. HICKS.

Witnesses:
Jos. T. GALLAGHER,
H. E. ESSLEY.